United States Patent
Jensen et al.

(10) Patent No.: US 11,248,588 B2
(45) Date of Patent: Feb. 15, 2022

(54) WIND TURBINE BLADE HAVING A LIGHTNING TIP RECEPTOR

(71) Applicant: Vestas Wind Systems A/S, Aarhus N. (DK)

(72) Inventors: Jakob Hjorth Jensen, Spjald (DK); Lasse Lykkegaard, Herning (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 16/321,077

(22) PCT Filed: Jul. 27, 2017

(86) PCT No.: PCT/DK2017/050249
§ 371 (c)(1),
(2) Date: Jan. 28, 2019

(87) PCT Pub. No.: WO2018/019349
PCT Pub. Date: Feb. 1, 2018

(65) Prior Publication Data
US 2019/0162171 A1    May 30, 2019

(30) Foreign Application Priority Data

Jul. 29, 2016   (DK) ........................... PA 2016 70566

(51) Int. Cl.
*F03D 1/06*       (2006.01)
*F03D 80/30*      (2016.01)
*H02G 13/00*      (2006.01)

(52) U.S. Cl.
CPC ............ *F03D 80/30* (2016.05); *F03D 1/0633* (2013.01); *F03D 1/0675* (2013.01);
(Continued)

(58) Field of Classification Search
CPC ...... F03D 80/30; F03D 1/0633; F03D 1/0675; F05B 2280/105; F05B 2280/1072; H02G 13/80; Y02E 10/721
See application file for complete search history.

(56) References Cited

U.S. PATENT DOCUMENTS 5,998,731 A * 12/1999 Takamura .............. H02G 13/00
                                                         174/3
6,979,179 B2* 12/2005 Møller Larsen ........ F03D 80/30
                                                         415/4.3
(Continued)

FOREIGN PATENT DOCUMENTS

CN         101842587 A        9/2010
CN         102032099 A        4/2011
(Continued)

OTHER PUBLICATIONS

European Patent Office, International Search Report and Written Opinion in PCT Application No. PCT/DK2017/050249, dated Oct. 16, 2017.
(Continued)

*Primary Examiner* — J. Todd Newton
*Assistant Examiner* — Theodore C Ribadeneyra
(74) *Attorney, Agent, or Firm* — Wood Herron & Evans LLP

(57) ABSTRACT

A wind turbine blade comprising a main blade portion having a root end and a tip end, wherein a leading edge and a trailing edge extend between the root end and the tip end, and a conductive blade tip module that abuts the tip end of the main blade portion; wherein the conductive blade tip module comprises an elongate body defining a longitudinal axis transverse to a spanwise axis of the blade, and wherein the conductive blade tip module has a length in a direction
(Continued)

along said longitudinal axis that is greater than a chord length of the blade tip interface.

16 Claims, 7 Drawing Sheets

(52) U.S. Cl.
CPC . *F05B 2280/105* (2013.01); *F05B 2280/1072* (2013.01); *H02G 13/80* (2013.01); *Y02E 10/72* (2013.01)

(56) References Cited

U.S. PATENT DOCUMENTS

| | | | |
|---|---|---|---|
| 7,766,620 B2* | 8/2010 | Stam | F03D 1/0675 416/146 R |
| 8,342,805 B2* | 1/2013 | Mendez Hernandez | F01D 11/00 416/146 R |
| 9,371,817 B2 | 6/2016 | Olthoff | |
| 10,082,129 B2* | 9/2018 | Altmikus | F03D 13/10 |
| 10,669,996 B2* | 6/2020 | Whitehouse | H01B 13/0036 |
| 2007/0253824 A1 | 11/2007 | Eyb | |
| 2008/0014090 A1* | 1/2008 | Aynsley | F04D 29/34 416/204 R |
| 2008/0193292 A1 | 8/2008 | Stam et al. | |
| 2009/0056968 A1* | 3/2009 | Bertelsen | F03D 80/30 174/2 |
| 2011/0076149 A1* | 3/2011 | Santiago | F03D 1/0675 416/223 R |
| 2011/0110789 A1* | 5/2011 | Luebbe | F03D 80/30 416/241 R |
| 2011/0305574 A1* | 12/2011 | Stiesdal | F03D 80/30 416/146 R |
| 2012/0128501 A1* | 5/2012 | Hoofard | F04D 29/384 416/241 R |
| 2012/0301300 A1* | 11/2012 | Muto | H02G 13/00 416/146 R |
| 2014/0112787 A1* | 4/2014 | Bracht | F03D 80/30 416/146 R |
| 2014/0186175 A1 | 7/2014 | Baehmann et al. | |
| 2016/0153424 A1* | 6/2016 | Rohden | F03D 9/25 416/146 R |
| 2016/0177915 A1* | 6/2016 | Gonzalez | F03D 1/0675 416/223 R |
| 2016/0245264 A1* | 8/2016 | Sogaard | F03D 80/30 |
| 2016/0258423 A1* | 9/2016 | Whitehouse | F03D 1/0675 |
| 2016/0327020 A1* | 11/2016 | Tobin | F03D 1/0675 |
| 2018/0094621 A1* | 4/2018 | Olsen | F03D 13/10 |
| 2018/0135602 A1* | 5/2018 | Tobin | F03D 80/30 |
| 2018/0266388 A1* | 9/2018 | Hallissy | F03D 80/30 |
| 2018/0274521 A1* | 9/2018 | Akhtar | F03D 80/30 |
| 2019/0040846 A1* | 2/2019 | Flach | F03D 13/10 |
| 2019/0195203 A1* | 6/2019 | Fujioka | H02G 13/00 |

FOREIGN PATENT DOCUMENTS

| | | | | |
|---|---|---|---|---|
| CN | 102345567 | A | 2/2012 | |
| CN | 203339481 | U | 12/2013 | |
| CN | 103857902 | A | 6/2014 | |
| CN | 203645138 | U | 6/2014 | |
| CN | 205349620 | U | 6/2016 | |
| DE | 102005051537 | A1 | 5/2007 | |
| DE | 102015200370 | A1 | 7/2015 | |
| DK | 164294 | B | 6/1992 | |
| EP | 1154537 | A2 | 11/2001 | |
| EP | 2305999 | A2 | 4/2011 | |
| EP | 2416005 | A1 | 2/2012 | |
| EP | 2589803 | A1 | 5/2013 | |
| EP | 2789851 | A1 | 10/2014 | |
| EP | 3037655 | A1 | 6/2016 | |
| EP | 3557046 | A1 * | 10/2019 | ........... F03D 1/0675 |
| JP | 2008115783 | A | 5/2008 | |
| WO | 9607825 | A1 | 3/1996 | |
| WO | 2005031158 | A2 | 4/2005 | |
| WO | 2012031976 | A1 | 3/2012 | |
| WO | 2015003718 | A1 | 1/2015 | |
| WO | 2015055213 | A1 | 4/2015 | |

OTHER PUBLICATIONS

Danish Patent and Trademark Office, Search and Exam Report in PA 2016 70566, dated Feb. 24, 2017.
China National Intellectual Property Administration, First Notification of Office Action in CN Application No. 201780052301.0, dated Nov. 13, 2019.
China National Intellectual Property Administration, Second Notification of Office Action in CN Application No. 201780052301.0, dated May 18, 2020.
China National Intellectual Property Administration, Third Notification of Office Action in CN Application No. 201780052301.0, dated Oct. 22, 2020.
European Patent Office, Notice of Opposition in corresponding EP Patent No. 3491242, Jun. 11, 2021.
Recommended Practice 09_Lightning Protection.

* cited by examiner

WIND TURBINE BLADE HAVING A LIGHTNING TIP RECEPTOR

TECHNICAL FIELD

The invention relates a wind turbine blade incorporating a lightning receptor component that may be fitted to the blade after fabrication.

BACKGROUND

Wind turbines are vulnerable to being struck by lightning; sometimes on the tower, nacelle and the rotor hub, but most commonly on the blades. A lightning strike event has the potential to cause physical damage to the turbine blades and also electrical damage to the internal control systems of the wind turbine. Wind turbines are often installed in wide open spaces which makes lightning strikes a common occurrence. Accordingly, in recent years much effort has been made by wind turbine manufacturers to design wind turbines so that they are able to manage effectively the energy imparted to them during a lightning strike in order to avoid damage to the blade and the associated cost of turbine down-time during blade replacement.

Lightning protection systems for wind turbine blades are known. In one example, an electrically conductive lightning receptor element is arranged on an outer surface of the blade to receive a lighting strike. Since the receptor element is electrically conductive, lightning is more likely to attach to the receptor element in preference to the relatively non-conductive material of the blade. The receptor element is connected to a cable or 'down conductor' that extends inside the blade to the root and from there connects via an armature arrangement to a charge transfer route in the hub, nacelle and tower to a ground potential. Such a lightning protection system therefore allows lightning to be channelled from the blade to a ground potential safely, thereby minimising the risk of damage. However, the discrete receptor elements are relatively complex to install during fabrication of the blade and, moreover, they leave a significant portion of blade area exposed to a risk of lightning strike.

Observation of the effects of lightning strikes on turbine blades has revealed that the highest proportion of lightning strikes happen at the blade tips. To address this, WO2005/031158 A2 proposes a turbine blade having a solid metal tip. Configuring the tip of the blade in this way makes the tip highly resilient to frequent highly energetic lightning strikes and means that inspection and servicing events are required less often. However, one drawback of such a configuration is the challenge of integrating the metal tip into the rest of the blade structure in as seamless a way as possible whilst ensuring robustness against weathering. A further example is described in WO2015/055213 A1, in which a metal blade tip module is attached to a wind turbine blade by way of an insert member that is built in to the tip of the blade during manufacture.

These tip receptors have been proven effective at attracting lightning strikes thereby protecting the vulnerable material of the blade from being damaged. However, it has been observed that the junction between the tip receptor and the blade is vulnerable to excessive wear and that, over time, the tip receptors begin to show heat erosion. It is against this background that the invention has been devised.

SUMMARY OF THE INVENTION

Against this background, the embodiments of the invention provide a wind turbine blade comprising a main blade portion having a root end and a tip end, wherein a leading edge and a trailing edge extend between the root end and the tip end, and a conductive blade tip module connected to a blade tip interface at the tip end of the main blade portion; wherein the conductive blade tip module comprises an elongate body defining a longitudinal axis transverse to a spanwise axis of the blade, and wherein the conductive blade tip module has a length in a direction along said longitudinal axis that is greater than a chord length of the blade tip interface.

The conductive blade tip module serves as a lightning receptor at the tip end of the blade.

The length of the blade tip module means that its nose and/or its tail are displaced from the leading and trailing edges of the blade with the result that lightning is less likely to attach to or 'jump' onto the composite structure of the blade. Beneficially, therefore, the blade tip module performs better in capturing lightning strikes than tip receptors of the prior art.

Furthermore, due to the aerodynamic shape of the blade tip module, like a torpedo, the nose and tail of the blade tip module are more robust than a thin trailing edge of a tip receptor that is shaped to resemble a blade tip.

The blade tip module is longer than the tip end of the blade in a chordwise direction so that a nose and tail of the blade tip module are separated a predetermined distance from the leading and trailing edges of the blade at the blade tip interface. Expressed another way, a leading edge or nose of the blade tip module extends beyond the leading edge of the blade at the blade tip interface, and alternatively, or in addition, a trailing edge or tail of the blade tip module extends beyond the trailing edge of the blade at the blade tip interface. In one embodiment, the leading edge of the blade tip module may extend at least 10 mm beyond the leading edge of the blade at the blade tip interface. Likewise, the trailing edge of the blade tip module may extend at least about 10 mm beyond the trailing edge of the blade at the blade tip interface. However, the distances may be less than 10 mm, for example 5 mm in some embodiments. In an example, the blade tip module extends beyond the leading edge and the trailing edge by 15 mm.

Preferably, the nose and the tail have high rates of curvature. Therefore, these parts of the blade tip module are more likely to attract lightning strikes. If the nose and tail are displaced from the leading and trailing edges of the blade, this means that lightning is less likely to attach to or 'jump' onto the composite structure of the blade. Furthermore, the nose and tail of the blade tip module are more robust than a thin trailing edge of a tip receptor that is shaped to resemble a blade tip.

Since it acts as a lightning receptor, the blade tip module is of metallic construction, and in one embodiment the blade tip module is made of solid metal which provides optimum conduction characteristics and robustness against lightning strikes. Suitable materials may be copper or a copper alloy. The blade tip module is coupled to a lightning protection system of the wind turbine blade.

The blade tip interface defines an outer edge, and the blade tip module may be configured such that a lip of the blade tip module overlaps the outer edge of the blade tip interface. Since the blade tip module is configured to overlap the tip edge of the blade, this protects the junction between the two components from erosion due to weathering. It may also have a benefit in protecting the junction from erosion due to electrical heating of the blade tip module experienced during lightning strikes. In some embodiments, the blade tip is truncated. The outer edge of the blade tip interface is in a plane transverse to the longitudinal axis of the main blade portion.

In one embodiment, the overlapping lip of the blade tip interface extends about the entirety of the outer edge of the blade tip interface. The overlapping lip of the blade tip module may surrounds a recess in the blade tip module, and wherein the blade tip interface is received into the recess so that the lip of the blade tip module overlaps the outer edge of the blade tip interface.

In order to secure the blade tip module to the blade, in one embodiment an attachment plate protrudes from the blade tip interface and is received into a pocket defined in the blade tip module. The blade tip module may then be secured to the attachment plate by suitable fasteners such as bolts.

The recess of the blade tip module may be shaped to resemble the tip end of the blade so that both have similar aerofoil profiles. That is, the outer edge of the attachment face and the outer edge of the blade tip interface define complementary aerofoil profiles. In some embodiments, there may be a close similarity such that the outer edge of the attachment face has a shape matching the outer edge of the blade tip interface.

It is important that the size of the blade tip module is such that it can receive the tip end of the blade within it in an overlapping fashion. Thus, in one embodiment, the blade tip module comprises an elongate body defining a longitudinal axis substantially parallel to a chordline at the blade tip interface, wherein the blade tip module has a length in a direction along its longitudinal axis that is greater than the chord length of blade tip interface. Furthermore, the blade tip module may also define a thickness axis perpendicular to its longitudinal axis, and wherein the blade tip module has a length along the thickness axis that is greater than the thickness of the blade tip interface.

BRIEF DESCRIPTION OF THE DRAWINGS

For a more complete understanding of the invention, some examples will now be described with reference to the following drawings, in which.

DETAILED DESCRIPTION

Figure 1:
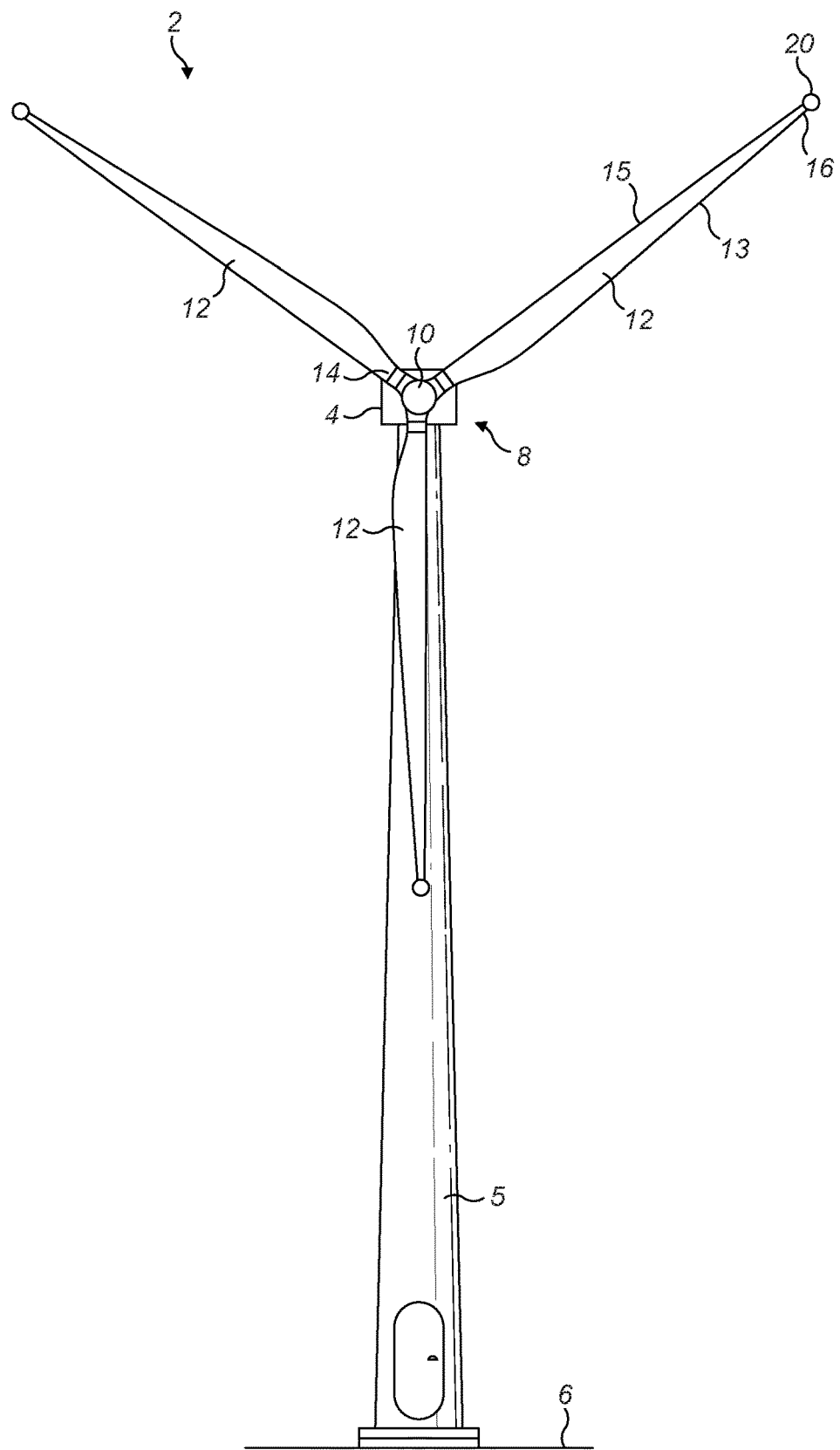
FIG. 1 is a view of a wind turbine in accordance with an example of the invention.

With reference to FIG. 1, a wind turbine 2 includes a nacelle 4 supported on a tower 5 that is mounted on a foundation 6. The wind turbine 2 depicted here is an onshore wind turbine such that the foundation 6 is embedded in the ground, but the wind turbine 2 could also be an offshore installation in which case the foundation 6 would be provided by a suitable marine platform, such as a monopile or jacket.

The nacelle 4 supports a rotor 8 comprising a hub 10 to which three blades 12 are attached. It will be noted that the wind turbine 2 is the common type of horizontal axis wind turbine (HAWT) such that the rotor 8 is mounted at the nacelle 4 to rotate about a horizontal axis defined at the centre of the hub 10. As is known, the blades 12 are acted on by the wind which causes the rotor 8 to rotate about its axis thereby operating generating equipment that is housed in the nacelle 4. The generating equipment is not shown in FIG. 1 since it is not central to the examples of the invention.

Each of the blades 12 has a root end 14 proximal to the hub 10 and a tip end 16 distal from the hub 10. A leading edge 13 and a trailing edge 15 extend between the root end 14 and tip end 16. The tip end 16 of each blade 12 is provided with a conductive blade tip module 20, which is shown in conceptualised form in FIG. 1, but which will be described in more detail in the discussion that follows.

Figure 2:
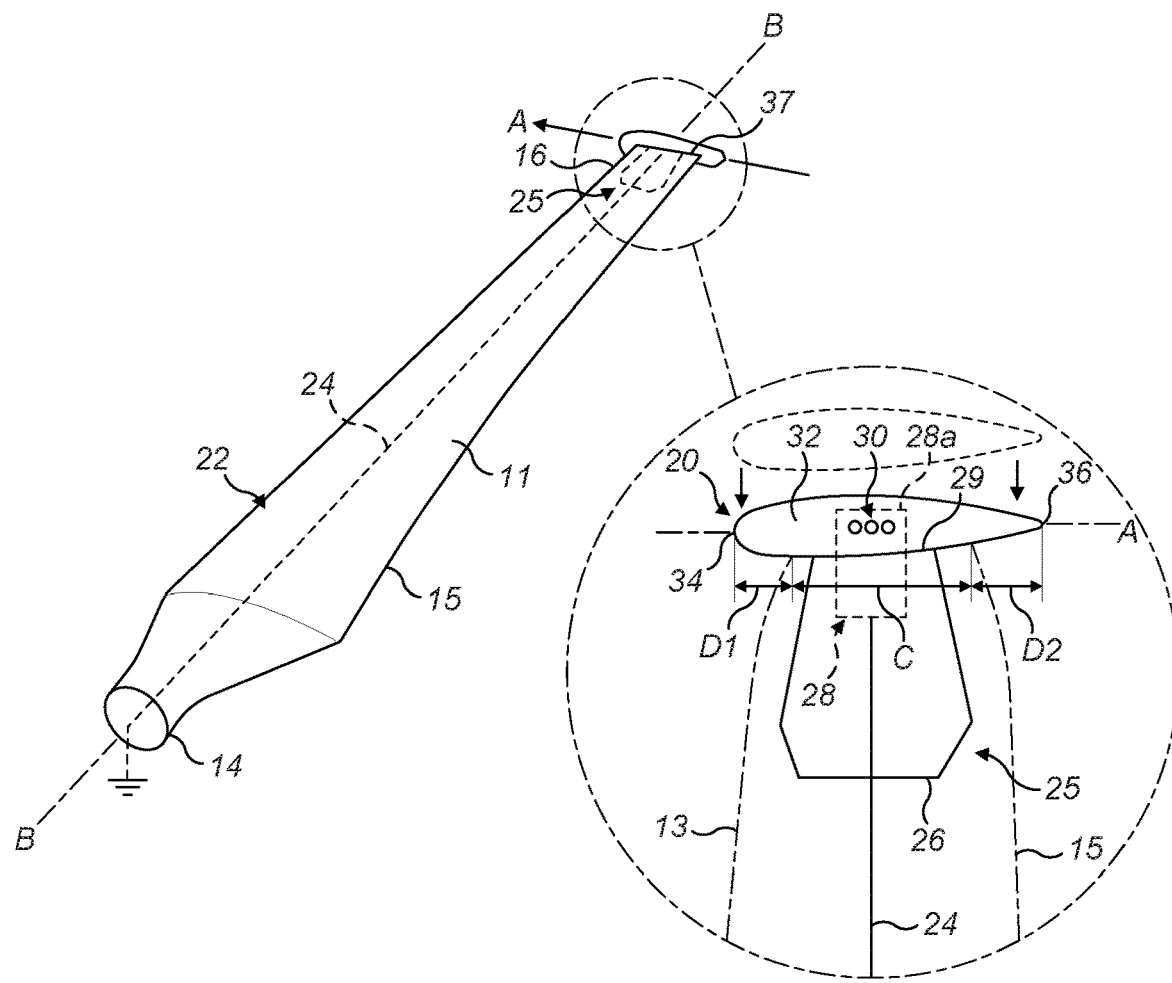
FIG. 2 is a perspective view of one of the blades of the wind turbine in FIG. 1, and shows in an inset panel an enlarged view of a tip region of the blade in more detail.

One of the blades 12 is shown in an enlarged form in FIG. 2 in which the shape of the blade tip module 20 is more clearly apparent. The blade tip module 20 is attachable to the tip end 16 of a main blade portion 11 of the blade 12 and is at least partly of metallic construction so that it is conductive and thus functions as a tip receptor for the blade 12. In this example, the blade tip module 20 is solid metal and made of a suitable material such as copper or an alloy such as brass, by way of non-limiting example. It is envisaged that the blade tip module 20 would be a cast component, although various manufacturing techniques would be suitable.

So that it can act as a lightning receptor, the blade tip module 20 is attached to a lightning protection system 22 of the blade 12. In this example, the lightning protection system 22 is shown schematically as a down conductor cable 24 running along the length of the blade 12 to the root end 14 where it earths via a suitable energy handling mechanism (not shown). It should be appreciated that lightning protection systems may be more complex than shown here, but the precise form of lightning protection system is not relevant to the discussion.

In the illustrated example, the blade tip module 20 is not an integral part of the blade but is attached to the blade after it has been manufactured, as shown by dashed lines, for example after a generally known composite layup process. The tip end 16 of the blade 12 therefore comprises an attachment system 25 for attaching the blade tip module 20 to the tip end 16 of the blade 12. The attachment system 25 comprises an insert member 26 or 'implant' which is a polymeric lozenge-like part which houses a metallic attachment plate 28. The insert member 26 provides an anchor within the region near to the tip of the blade 12 so that the blade tip module 20 can be attached to the blade 12 in a secure way. The insert member 26 is adhesively bonded into the interior cavity of the blade 12 during its fabrication process and is positioned so that the attachment plate 28 protrudes from a blade tip interface 29 of the blade 12 thereby providing an anchoring tab 28a to which the blade tip module 20 can be attached. In the illustrated example, the blade tip interface 29 is the outermost part of the blade which engages with and is coupled to the blade tip module 20. Here, the blade has a flat end face In the illustrated example, the blade tip module 20 is attached to the anchoring tab 28a by a set of suitable mechanical fasters 30 such as bolts. In general, the insert member 26 may take the form as described in WO2015/055213, by way of example. However, it should be noted that the attachment system 24 described here illustrates one way to couple the blade tip module 20 to the blade 12 and that the skilled person could conceive of other ways to achieve this.

Figure 5:
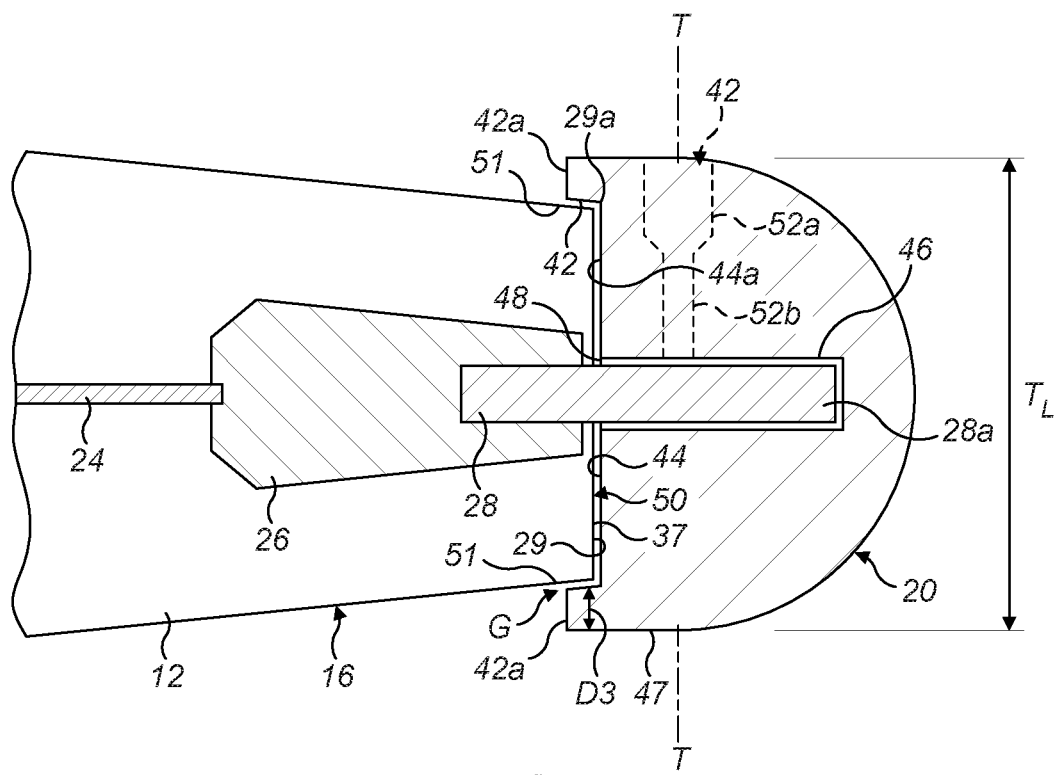
FIG. 5 is a schematic section view of the blade tip module attached to a blade.

The blade tip module 20 comprises an elongate body 32 that defines a longitudinal axis 'A' that is transverse to the longitudinal or 'spanwise' axis 'B' of the blade 12 and aligned with the chord of the blade. The elongate body 32 has an aerofoil profile in cross section, much like an elongate teardrop, cigar or torpedo, so as to define a nose 34 and a tail 36. The nose 34 of the blade tip module 20 may be referred to as a leading edge, and the tail 36 may be referred to as a trailing edge, even if the nose and tail taper to an apex or point. This general shape minimises drag forces on the blade as it rotates in use. Notably, the elongate body 32 has a length along the longitudinal axis 'A' that is greater than the chord length at the blade tip interface, which is marked on FIG. 2 as 'C'. As such, the nose 34 of the elongate body 32 extends forwards beyond the leading edge 13 of the blade 12 at the tip interface and the tail 24 of the elongate body 32 extends rearwards beyond the trailing edge 15 of the blade 12 at the tip interface. Note, here, that the terms 'forwards' and 'rearwards' are used with respect to the normal direction of rotation 'R'. Note also that the term 'chord length' is the dimension taken across the blade chord extending through the trailing edge and leading edge. Since the blade chord length varies with spanwise position, and also rotates due to the twist of the blade, here the chord length is expressed as being at the tip end 16 of the blade, that is at the blade tip interface 29. Similarly, and as shown in FIG. 5, the blade tip module 20 defines a thickness axis 'T' that is perpendicular to its longitudinal axis A. The blade tip module 20 is shaped such that the thickness of the blade tip module at the blade tip interface, that is to say its length ($T_L$) taken along the thickness axis, is greater than the thickness of the blade at the blade tip interface.

The blade tip module 20 has a tip end 21 which faces away from the blade 12 and a root end 23 which faces toward the blade 12.

Beneficially, the shape of the blade tip module 20 means that its nose 34 and tail 36 are displaced transversely from the aerodynamic profile of the blade 12 at the blade tip interface 29. Since the nose 34 and tail 36 are highly curved, having a low radius of curvature, lightning will tend to attach to the blade tip module 20 at these points which, by virtue of the shape of the blade tip module 20, are positioned away from the blade. The effect of this is to reduce the likelihood that lightning will attach to other metallic elements of the blade, for example the internal down conductor, which could damage the composite structure of the blade 12.

The distance (D1 and D2) that the blade tip module 20 extends beyond the leading and trailing edges of the blade at the blade tip interface 29 may be selected to optimise performance of the blade tip module 20 whilst having regard to aerodynamic and weight considerations. In principle, it may be preferable to position the nose and the tail of the blade tip module 20 a significant distance from the blade tip interface 29, for example between 20 and 50 cm, and even up to 100 cm. However, it is envisaged that a major benefit would be achieved by a more modest separation distance, for example between 10 mm and 100 mm without adversely affecting the aerodynamics or loading of the blade.

The discussion above explains the beneficial attributes of the general shape of the blade tip module 20. The discussion will now focus on the way in which the blade tip module 20 is secured to the blade tip interface 29, and specific reference will also now be made to FIGS. 3a, 3b, 4, 5 and 6.

As has been mentioned, the blade tip module 20 is attached to the blade 12 so that it abuts up against the blade tip interface 29. It is common for blade tips to taper to an apex or point, so it will be appreciated that in the illustrated example that the blade tip is truncated and does not taper to an apex or point. This provides a blade tip interface 29 which is substantially flat and defines an end face 37 that is transverse to the longitudinal axis B of the blade 12, which is seen particularly clearly in FIG. 2. It will be noted that in the illustrated example, the end face 37 is approximately perpendicular to the longitudinal axis of the blade, although perpendicularity is not essential, and so the term 'transverse' is to be interpreted as not necessarily being perpendicular.

The end face 37 is thus surrounded by an outer edge 29 of the blade tip interface 29 that has an aerofoil profile. Since it has a flat end face 37, the tip of the blade 12 has a suitable surface for abutting up against the blade tip module 20 as will be explained. The blade tip interface 29 therefore acts as an interface or mounting to which the blade tip module 20 can be mounted to the tip end 16 of the blade 12. The configuration illustrated here is one possibility but the skilled person would understand that other configurations would be possible whilst retaining the function of being a mounting point for the blade tip module 20.

A simple abutting relationship between the blade tip module 20 and the blade tip interface 30 would mean that the junction between the two components would have to be sealed before the blade could be used. This is the case with the blade tip module described in WO2015/055213. However, it is an advantage of the blade tip module 29 of the embodiments of the invention that it is configured to abut up against the blade tip interface 29 in a way that protects the junction between the two components.

Figure 3A:
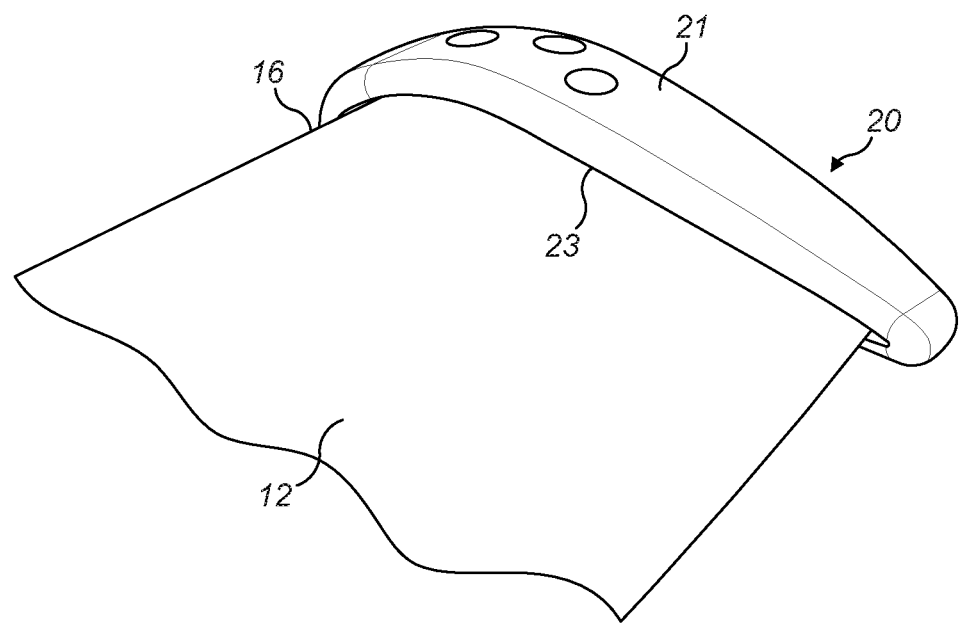
FIGS. 3a and 3b are views of the blade shown in FIG. 2 but from alternative viewing angles.
Figure 3B:
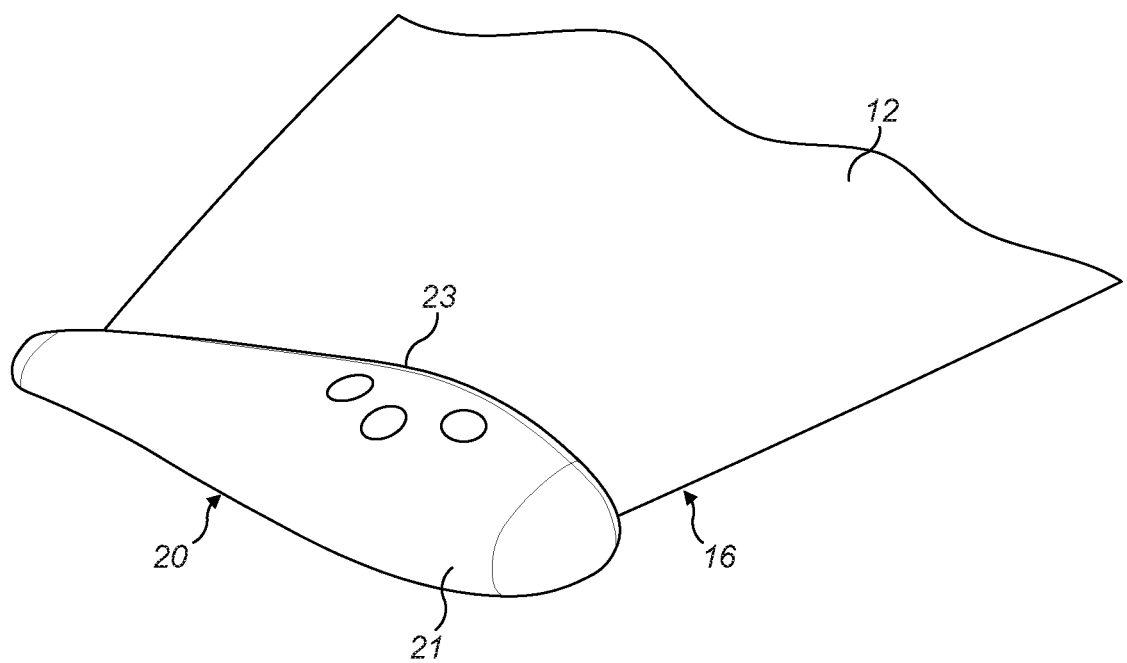
Figure 4:
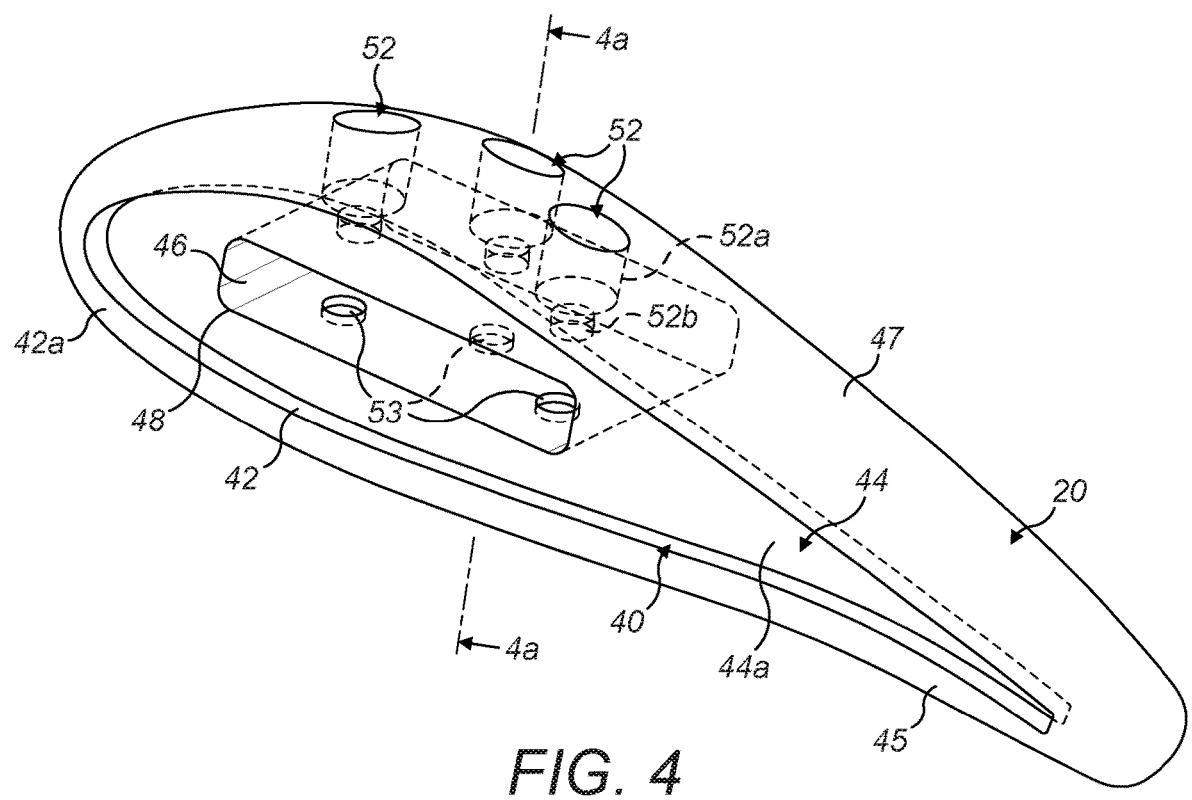
FIG. 4 is a perspective view of a blade tip module of the preceding figures shown isolated from the blade.

FIGS. 3a and 3b, complemented by FIG. 4, show an example of a practical example of the blade tip module 20. Whereas FIGS. 3a and 3b show the blade tip module 20 attached to the blade 12, FIG. 4 shows the blade tip module 20 separated from the blade 12 so that features of the blade tip module 20 that permit it to attach to the blade 12 are more clearly apparent.

As can be seen, the blade tip module 20 abuts or fits against the tip end 16 of the blade and so defines an aerodynamic blade tip receptor for the blade. However, the blade tip module 20 is configured such that a portion of it overlaps the tip end 16 of the blade so that it protects the junction between the blade tip module 20 and the blade tip interface 29.

Figure 4A:
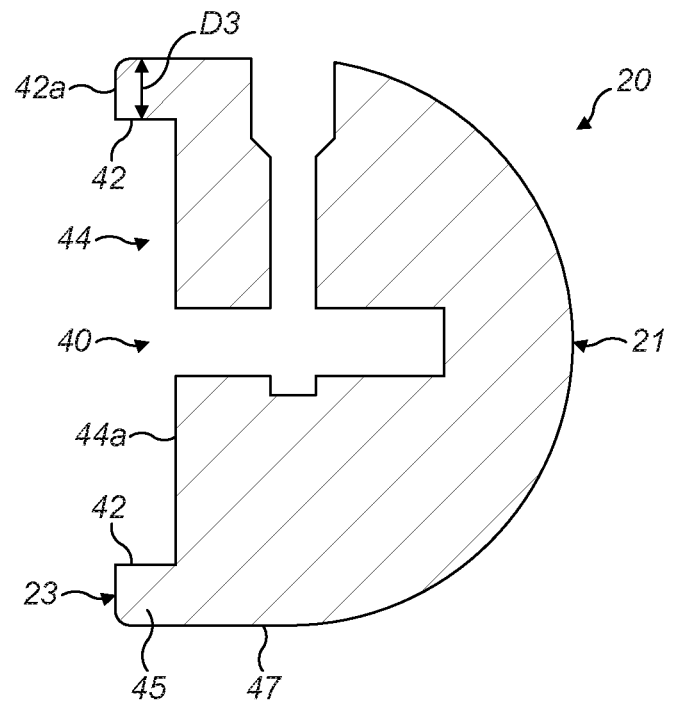
FIG. 4a is a schematic section view of the blade tip module.

The reverse side of the blade tip module 20 is shown in FIG. 4. FIG. 4a shows a cross section of the blade tip module 20 through the line 4a-4a on FIG. 4. The blade tip module 20 is attached to the blade 12 at a module interface 40 which is shaped generally to match the aerofoil profile of the blade tip interface 29 at the tip end 16 of the blade 12, although being slightly larger so as to accommodate the tip end 16 of the blade within it.

The module interface 40 comprises a recess 44 as shown in FIGS. 4 and 4a. The recess 44 is defined by an internal edge wall 42 and a base or floor 44a. Expressed another way, the blade tip module 20 has a recessed end face 42a that faces toward the root of the wind turbine blade. In this end face 42a the recess 44 comprises an edge wall 42 and a base 44a. The end face 42a extends around the perimeter of the blade tip module 20 at the root end 23 of the blade tip module.

The blade tip module 20 comprises a lip 45 as shown in FIG. 4a. In particular, the lip 45 extends around the periphery of the root end 23 of the blade tip module 20 and it defines the recess 44. The lip 45 comprises the material of the blade tip module 20 that is between the edge wall 42 and an outer surface 47 of the tip module. The edge wall 42 therefore defines the radial inner part of the lip 45. When considering the cross section of FIG. 4a, it can be seen that the lip 45 is raised above the base 44a in the direction of the root end 23 and has a thickness defined by D3.

Figure 2A:
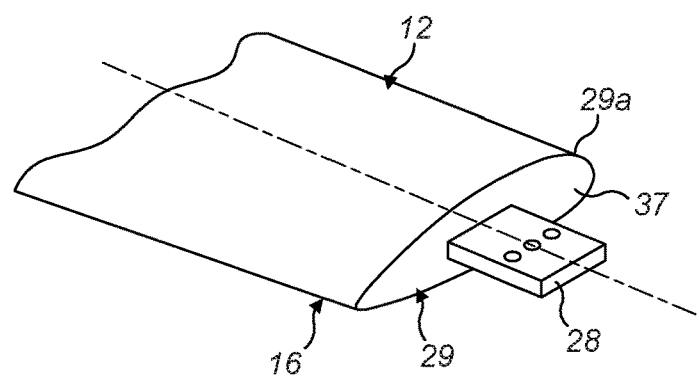
FIG. 2a shows detail of the tip end of the blade.

The recess 44 is aerofoil-shaped and is sized so that it is comparable to the blade tip interface 29. The blade tip interface 29 can therefore be received into the recess 44 so that the wall 42 overlaps an outer edge 29a (see FIG. 2a) of the blade tip interface 29. In other words, the outer edge 29a of the blade tip interface is covered by the lip 45. In the illustrated example, the wall 42 extends about the entirety of the outer edge 29a of the blade tip interface 29, although it would also be acceptable for the wall 42 to be shaped so that it overlaps only a portion of the blade tip interface, for example on either of the suction or pressure sides, or over the leading or trailing edges of the blade, depending on where the overlap is considered to be more desirable.

This configuration can be seen particularly clearly in FIG. 5, which is a section view through the blade tip end 16 and the blade tip module 20 approximately along the longitudinal axis B of the blade. From this, it is apparent that the blade tip interface 29 is received within the recess 44. The blade tip interface 29 faces the base 44a of the recess 44 so as to define a junction 50 therebetween. The blade tip interface 29 may abut the base 44a or there may be a gap between the blade tip interface 29 and the base 44a. This junction 50 is protected by the edge wall 42 of the module interface 40 which extends over the outer edge 29a of the blade tip interface 29. Such a configuration is easy to weatherproof simply by filling any gap 'G' between the edge wall 42 of the blade tip module 20 and the blade 12 with a suitable sealant, such as a silicone sealant. The dimension of the edge wall 42 and, thus, the recess 44 can be configured so that they are able to accommodate imperfections in the aerofoil profile of the blade tip end 16 which means that a time-consuming finishing process for the tip end can be avoided, or at least reduced.

Significantly, the blade tip module 20 has a substantial thickness of material in the region of the edge wall 42. That is, the thickness D3 of the lip has a substantial value. This means that the blade tip module 20 is robust against lightning strikes since there is plenty of mass around the edge wall 42 to absorb the intense heating effects of a lightning strike. Conversely, if the lip 45 was thin, then the blade tip module 20 would be more vulnerable from heat erosion. Therefore, the lip 45 can be described as a protective lip that protects the blade tip interface 29. More specifically, it will be noted that the end face 42a of the blade tip module 42 that is adjacent the edge wall 42 extends away from the underlying blade surface 51. In particular, the edge wall 42 extends in a direction that is transverse to the blade surface 51 such that the lip 45 is provided with the substantial thickness. It will be noted that in the illustrated example, the end face 42a is perpendicular to the longitudinal axis of the blade, although perpendicularity is not essential, and so the term 'transverse' is to be interpreted as not necessarily being perpendicular. It is envisaged that a suitable thickness in that region will be greater than 5 mm, such as 10 mm by way of example. Expressed another way, the surface 42a is substantially parallel to the end face 37 of the blade tip interface 29.

It should be noted that the thickness of the lip 45 is defined in a direction away from the blade surface 51. The lip 45 will also have a length in the longitudinal direction of the blade.

In order to accommodate the anchoring tab 28a, the module interface 40 includes a rectangular pocket or slot 46 that extends into the body of the blade tip module 20 from an opening or mouth 48 at the floor of the recess 44. The pocket 46 is dimensioned to match the anchoring tab 28a so that the blade tip module 29 is simply able to be pushed onto the attachment plate 28 where it can be secured by suitable mechanical fasteners. In the illustrated example the elongate body 32 is shown as defining three vertical bores 52 that extend downwardly into the body 32 from an upper face thereof. Each of the bores 52 includes a relatively wide shank portion 52a provided with a screw thread (not shown) and a relatively narrow locking pin portion 52b. A suitably shaped screw-threaded fastener is therefore able to be screwed into the relatively wide shank portion 52a such that a locking pin passes through the locking pin portion 52b so as to engage with a corresponding locking hole provided in the attachment plate 28. Optionally, correspondingly positioned holes 53 can be positioned on the floor of the recess, as seen in FIG. 4, to receive locking pins that are passed through the attachment plate 28. It should be noted at this point that this manner of fixing the blade tip module 20 to the attachment plate 28 is one way in which the fixing could be achieved, but the skilled person could achieve of other fixing techniques.

It will be noted that in this example the attachment plate 28 only extends part of the way into the body of the blade tip module 20. However, examples are also envisaged in which the attachment plate 28 extends entirely through the body 30 so as to penetrate the opposing side of the body.

The skilled person would appreciate that the above examples represent only one way in which the invention could be put into effect and that various modifications could be made without departing from the inventive concept as defined by the claims. For example, in the above example, the nose 34 and the tail 36 of the blade tip module extend beyond the respective leading and trailing edges of the blade at its tip end 16. However, examples are also envisaged in which only one of the nose or the tail extends beyond the respective edge of the blade. Also, the extent to which the nose and the tail protrude beyond the respective edges of the blade at the tip end 16 may be the same, but this is not essential. Expressed another way, the blade tip module may be mounted to the tip end symmetrically or asymmetrically.

Figure 6A:
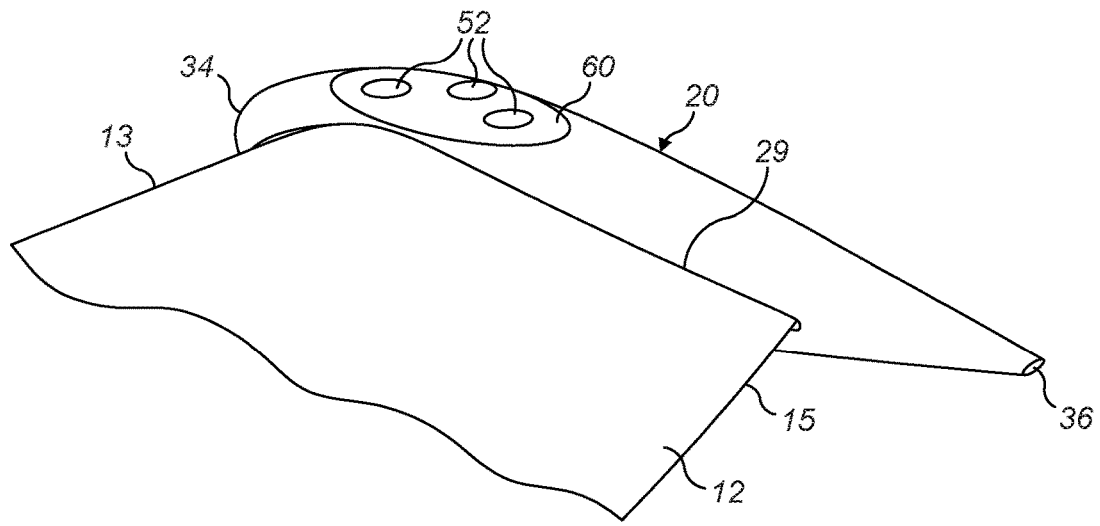
FIGS. 6a and 6b are perspective views of an alternative blade tip module.
Figure 6B:
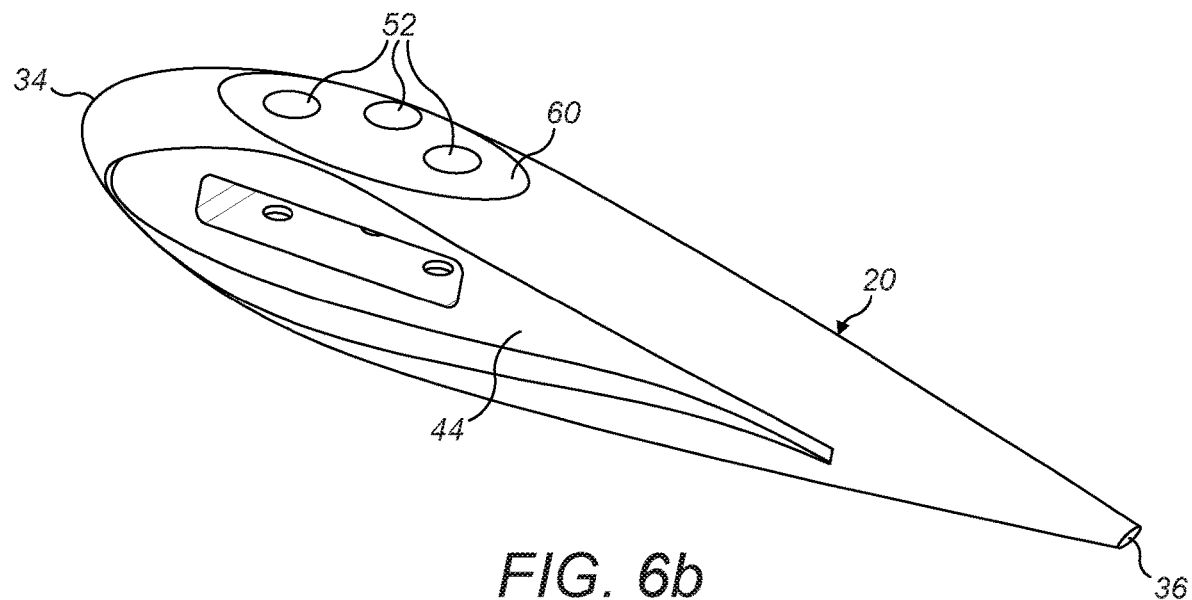

FIGS. 6a and 6b illustrate an alternative example, and parts common to previous examples are denoted with the same reference numerals. In contrast to previous examples, the blade tip module 20 in FIGS. 6a and 6b has a more slender shape such that its tail 36 is more elongated so that it extends rearward from the trailing edge 15 of the blade at the blade tip interface 29 significantly more than the nose 34 extends forwards of the leading edge 13. Elongating the shape of the blade tip module 20 in this way may provide some aerodynamic benefits but also may enable the tips of the module 29 to be positioned further away from the blade without increasing its weight.

Notably, the upper surface of the blade tip module 29 is shaped to include a flattened crown 60 which is elliptical in shape and provides a flat region at which the vertical bores 52 emerge. The flat area allows the vertical bores 52 to be capped with simple flat-topped insert caps (not shown) which do not affect the aerodynamic attributes of the blade tip module 29.

Figure 7:
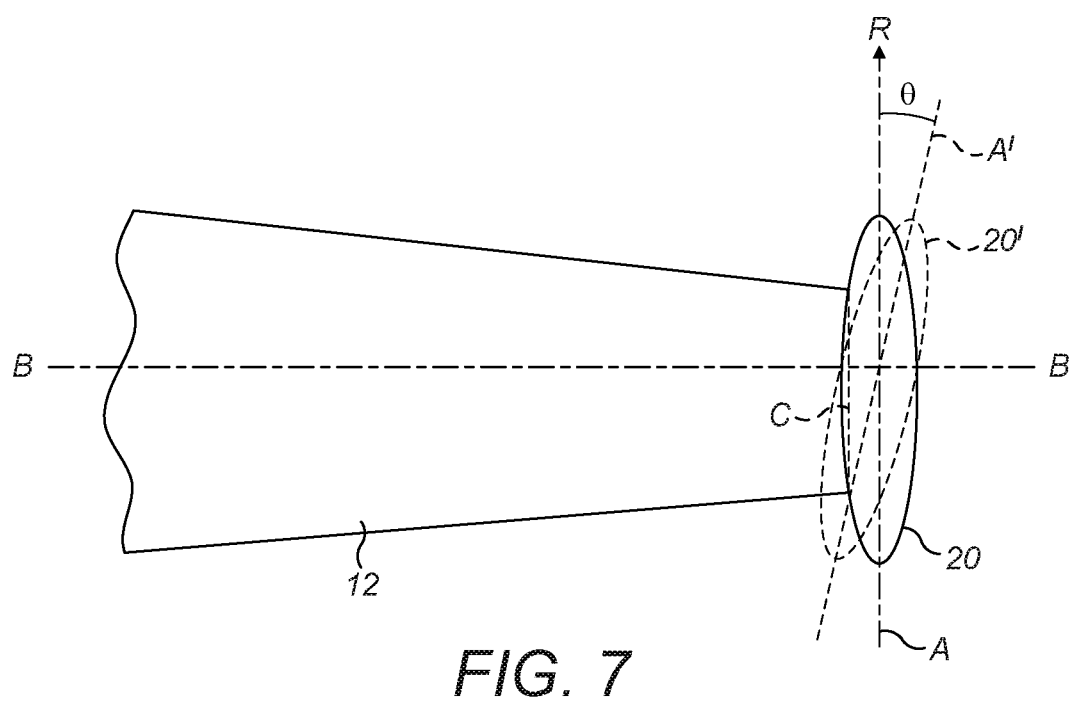
FIG. 7 illustrates an alternative example.

As has been described above, in the illustrated examples the blade tip module 20 has a longitudinal axis A that lies in the same plane as the longitudinal axis B of the blade 12 and also is perpendicular to that axis. However, it should be appreciated that this is not essential, and in other examples the blade tip module 20 may be configured so that its longitudinal axis A defines an angle with the chord of the blade C at the blade tip interface, although it may still be considered to be generally aligned with the chord C, though not exactly parallel with it. For example, the blade tip module 20 may be configured so that its nose 46 is angled radially outwards from the direction of rotation R of the blade (which also may be considered to be aligned with the blade chord), as is illustrated in FIG. 7. Here, an alternative blade tip module is illustrated with the prime symbol, 20', and it will be noted that the longitudinal axis A' of the blade tip module 20' now defines an angle θ relative to the direction of rotation of the blade. It is believed that angling the blade tip module in this way may achieve noise reduction benefits. It is envisaged that a relatively shallow angle θ would be most appropriate to achieve a noise reduction compared to the case where the blade tip module 20 is exactly perpendicular to the blade axis B, for example between 5 and 15 degrees, and more preferably 10 degrees. In this example, it should be noted that the longitudinal axis A' is oriented so that it shares the same plane as the chordline C at the blade tip interface in the same way as in previous examples.

The invention claimed is:

1. A wind turbine blade having a lightning protection system comprising:
   a main blade portion having a root end and a tip end, wherein a leading edge and a trailing edge extend between the root end and the tip end; and
   a conductive blade tip module connected to a blade tip interface at the tip end of the main blade portion and further connected to the lightning protection system of the wind turbine blade,
   wherein the conductive blade tip module comprises an elongate body having a length defining a longitudinal axis transverse to a spanwise axis of the main blade portion and a width that extends along the spanwise axis of the main blade portion,
   wherein the length of the conductive blade tip module is greater than a chordwise length of the blade tip interface, and
   wherein the blade tip interface defines an outer edge, and wherein the blade tip module is configured to fit against the blade tip interface such that a lip of the blade tip module overlaps the outer edge of the blade tip interface.

2. The wind turbine blade of claim 1, wherein a leading edge of the blade tip module extends beyond the leading edge of the main blade portion at the blade tip interface.

3. The wind turbine blade of claim 2, wherein the leading edge of the blade tip module extends at least 10 mm beyond the leading edge of the main blade portion at the blade tip interface.

4. The wind turbine blade of claim 1, wherein a trailing edge of the blade tip module extends beyond the trailing edge of the main blade portion at the blade tip interface.

5. The wind turbine blade of claim 4, wherein the trailing edge of the blade tip module extends at least 10 mm beyond the trailing edge of the main blade portion at the blade tip interface.

6. The wind turbine blade of claim 1, wherein the blade tip module defines an aerofoil profile in cross-section.

7. The wind turbine blade of claim 1, wherein the tip end of the blade is truncated.

8. The wind turbine blade of claim 1, wherein the overlapping lip of the blade tip module extends about the entirety of the outer edge of the blade tip interface.

9. The wind turbine blade of claim 1, wherein the lip of the blade tip module surrounds a recess in the blade tip module, and wherein the blade tip interface is received into the recess so that the lip of the blade tip module overlaps the outer edge of the blade tip interface.

10. The wind turbine blade of claim 9, wherein the recess comprises an edge wall, wherein the edge wall and the outer edge of the blade tip interface define complementary aerofoil profiles.

11. The wind turbine blade of claim 10, wherein the edge wall has a shape matching the outer edge of the blade tip interface.

12. The wind turbine blade of claim 1, wherein an attachment plate protrudes from the blade tip interface and is received into a pocket defined in the blade tip module.

13. The wind turbine blade of claim 1, wherein the blade tip module is solid metal.

14. The wind turbine blade of claim 1, wherein the blade tip module is fabricated from copper or a copper alloy.

15. A wind turbine blade having a lightning protection system comprising:
    a main blade portion having a root end and a tip end with a leading edge and a trailing edge extending between the root end and the tip end, wherein the tip end is truncated to define a blade tip end face; and
    a conductive blade tip module connected to a blade tip interface located at the blade tip end face of the main blade portion and further connected to the lightning protection system of the wind turbine blade,
    wherein the conductive blade tip module comprises an elongate body defining a longitudinal axis transverse to a spanwise axis of the main blade portion, and wherein the conductive blade tip module has a length in a direction along the longitudinal axis that is greater than a chordwise length of the blade tip end face, and
    wherein the blade tip end face defines an outer edge wherein the conductive blade tip module is configured to fit against the blade tip end face such that a lip of the conductive blade tip module overlaps the outer edge of the blade tip end face.

16. The wind turbine blade of claim 15, wherein the blade tip interface includes an attachment plate that protrudes from the blade tip end face and is received into a pocket in the conductive blade tip module.

* * * * *